US007663428B2

(12) United States Patent
Matano (10) Patent No.: US 7,663,428 B2
(45) Date of Patent: Feb. 16, 2010

(54) BOOSTING CHARGE PUMP CIRCUIT (75) Inventor: Tatsuya Matano, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 53 days.

(21) Appl. No.: 12/003,325

(22) Filed: Dec. 21, 2007

(65) Prior Publication Data
US 2008/0180163 A1    Jul. 31, 2008

(30) Foreign Application Priority Data
Dec. 26, 2006  (JP)  ............................. 2006-349320

(51) Int. Cl.
G05F 1/10 (2006.01)
(52) U.S. Cl. ...................................... 327/536; 327/537
(58) Field of Classification Search ......... 327/535–537, 327/390, 589
See application file for complete search history.

(56) References Cited

U.S. PATENT DOCUMENTS 6,714,065 B2 * 3/2004 Komiya et al. .............. 327/537
6,960,955 B2 * 11/2005 Nonaka ...................... 327/536
7,319,626 B2 * 1/2008 Cheon ........................ 365/203
7,439,794 B2 * 10/2008 Takeyama et al. ........... 327/536

FOREIGN PATENT DOCUMENTS

JP    2002-112532    4/2002
JP    2005-235315    9/2005

* cited by examiner

Primary Examiner—Hai L Nguyen
(74) Attorney, Agent, or Firm—McGinn IP Law Group, PLLC (57) ABSTRACT In order to resolve a problem of the conventional technique in which there is a charge pump capacitance which is not used when a boosting method of the charge pump is changed, in a charge pump circuit unit, a connection switching terminal selects a power source voltage, a logically-inverting buffer gate and a capacitor to conduct an operation of boosting the power source voltage so as to be twice the power source voltage, and a connection switching terminal outputs the boosted voltage as a boost control voltage. In a charge pump circuit unit, a connection switching terminal selects the boost control voltage outputted from the charge pump circuit unit, and a logically-inverting buffer gate and a capacitor conduct an operation of boosting the inputted voltage so as to be 3×VDD. An internal voltage is generated by outputting the boosted voltage to an internal power line via a NMOS transistor.

4 Claims, 8 Drawing Sheets

BOOSTING CHARGE PUMP CIRCUIT

BACKGROUND OF THE INVENTION

1. Field of the Invention

The present invention relates to a boosting charge pump circuit. In particular, the present invention relates to a boosting charge pump in which it is possible to switch boosting methods of the charge pump circuit which satisfy both DDR1 (double data rate 1) and DDR2 (double data rate 2) specifications, and avoids providing a charge pump capacitance (capacitor for the charge pump) not used in a semiconductor chip.

Priority is claimed on Japanese Patent Application No. 2006-349320, filed Dec. 26, 2006, the content of which is incorporated herein by reference.

2. Description of the Related Art

In a conventional semiconductor memory apparatuses, in order to boost an internal voltage, boosting charge pump circuits of "2×VDD" are applied to memory apparatus of the DDR1 specification which require a high source voltage (external source voltage), and boosting charge pump circuits of "3×VDD" are applied to memory apparatus of the DDR2 specification which require a low source voltage (external source voltage).

It should be noted that DDR2 is the name of a specification which provides better performance and consumes a smaller amount of power than DDR1, and is formulated by JEDEC (Joint Electron Device Engineering Council). There is a conventional DDR specification other than DDR2 that is called DDR1.

Figure 7:
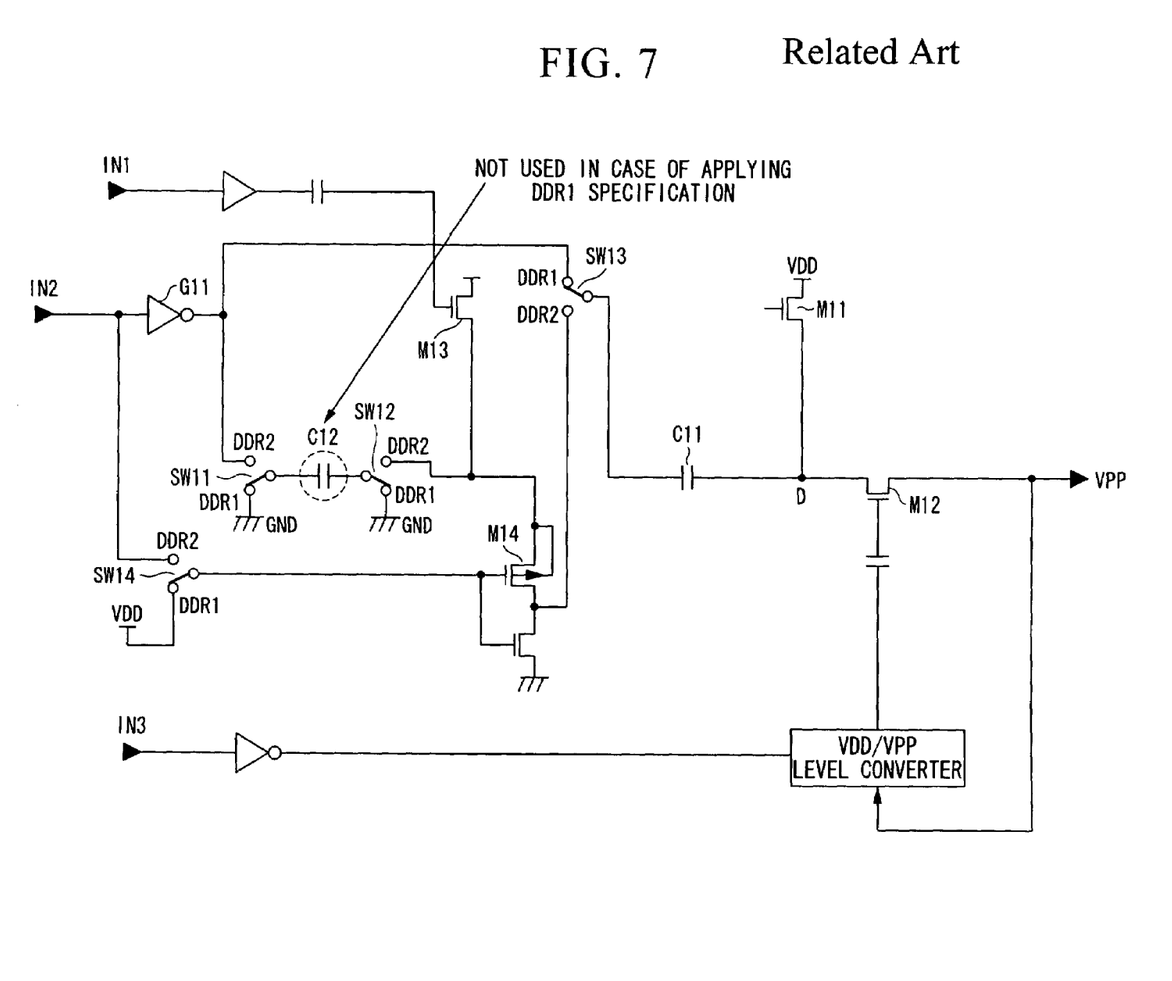
FIG. 7 is a drawing which shows a constitution of a boosting charge pump circuit of a conventional technique which satisfies DDR1 specifications.

FIG. 7 is a drawing showing an example of a constitution of a conventional boosting charge pump circuit that is used for both DDR1 and DDR2 specifications. Details of this circuit are not explained and only an outline of this circuit is explained here because details of a similar boosting charge pump circuit are explained in following embodiments.

In FIG. 7, a constitution is applied in which it is selectable whether or not a capacitor C12 inside the circuit is used by operating connection switching terminals SW11 and SW12.

As shown in the drawing, if the circuit is used in accordance with DDR1 specifications, the connection switching terminals SW11 and SW12 are connected to a side corresponding to DDR1, and the capacitor C12 is disconnected to the circuit in order not to use the capacitor 12C. Moreover, a connection switching terminal SW13 is connected to a side corresponding to DDR1 too.

In the above-described constitution, when a clock signal IN2 indicates "HIGH" (i.e., output of a logically-inverting buffer gate G11 is "LOW"), a capacitor C11 is charged to a voltage level that is the same as the power source voltage VDD by using a NMOS transistor M11.

After that, if the clock signal IN2 is changed to be LOW (i.e., output of a logically-inverting buffer gate G11 is a HIGH level), the voltage at a point (voltage of a point D) to which a drain terminal of the NMOS transistor M12 of the capacitor C11 is connected is boosted so as to be a voltage level of "2×VDD". After that, a clock signal IN3 is set to HIGH, a NMOS transistor M12 is set to ON, and the output voltage (internal voltage) VPP is generated. Therefore, the internal voltage VPP which satisfies "2×VDD>VPP>VDD" is obtained.

Figure 8:
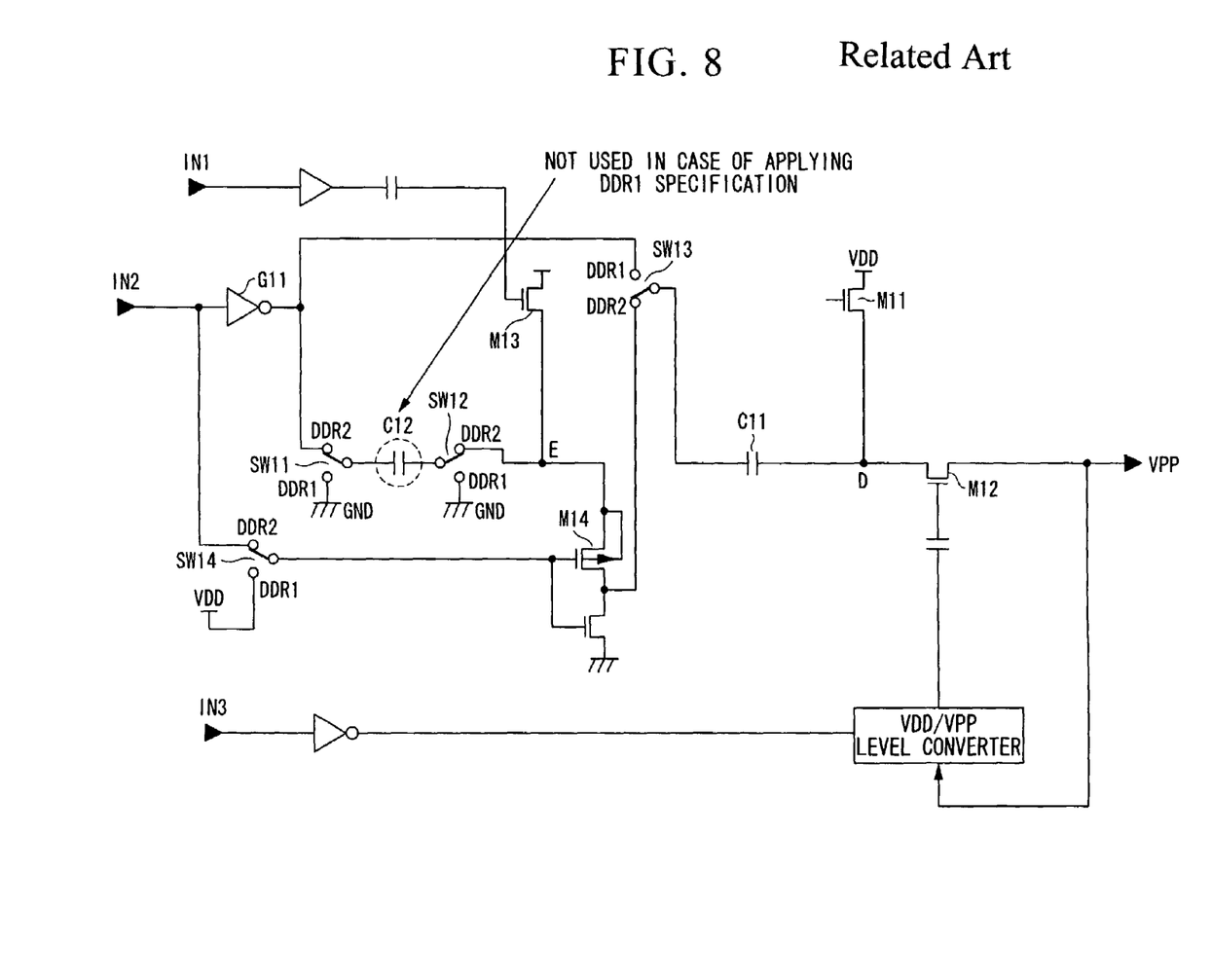
FIG. 8 is a drawing which shows a constitution of a boosting charge pump circuit of a conventional technique which satisfies DDR2 specifications.

On the other hand, if the circuit is used in accordance with DDR2 specifications, as shown in FIG. 8, both the connection switching terminals SW11 and SW12 are set to connect to a side corresponding to DDR2 in order to connect the capacitor C12 to the circuit. Moreover, both the connection switching terminals SW13 and SW14 are set to connect a side corresponding to DDR2.

In the above-described constitution, when a clock signal IN2 indicates "HIGH" (i.e., output of a logically-inverting buffer gate G11 is "LOW"), a capacitor C12 is charged to a voltage level that is the same as the power source voltage VDD by using an NMOS transistor M13. Here, at the same time, a capacitor C11 is charged to a voltage level so as to be the same as the power source voltage VDD by using an NMOS transistor M11.

After that, if the clock signal IN2 is changed to LOW (i.e., output of a logically-inverting buffer gate G11 is HIGH), the voltage of the capacitor C12 (voltage at a point E) is boosted so as to be a voltage level of "2×VDD", the voltage of "2×VDD" at the point E is applied to the capacitor C11 via a PMOS transistor (P-Channel MOSFET) M14 and the connection switching terminal SW13, and a voltage at an output side (point D) of the capacitor C11 is boosted so as to be a voltage level of "3×VDD". After that, a clock signal IN3 is set to HIGH, an NMOS transistor M12 is set to ON, and the internal voltage VPP is generated. Therefore, an internal voltage VPP which satisfies "VPP>2×VDD" is obtained.

The above described boosting charge pump circuit is useful because it is possible to switch between DDR1 and DDR2 specifications only by switching the wiring inside the circuit. However, there is a problem in which there is a charge pump capacitance (charge pump capacitance C12) which is not used after being switched to DDR1 specifications. An area shared by this charge pump capacitance is large and is a waste of chip area on the semiconductor.

It should be noted that in a conventional technique, a booster circuit is introduced (see Patent Document 1). The booster circuit of this conventional technique is provided because of an object of generating a different voltage which is higher than a power source voltage corresponding to usage or a purpose. In order to achieve such an object, the conventional technique provides a first charge pump circuit which boosts a voltage VDD in order to generate a voltage of 2×VDD, a second charge pump circuit which generates a voltage of 3×VDD, a third charge pump circuit which generates a voltage of 4×VDD and a switching portion 4. Based on switching signals, the switching portion 4 outputs a voltage of 3×VDD to an internal circuit of a semiconductor apparatus by serially connecting the first and second charge pump circuits and outputs a voltage of 4×VDD to the internal circuit of the semiconductor apparatus by serially connecting the first, second and third charge pump circuits.

However, the booster circuit of the above-described Patent Document 1 does not provide a solution of the above-described problem in which there is a charge pump capacitor which is not used when the wiring of the boosting charge pump circuit is switched so as to satisfy DDR1 specifications because the conventional technique has an object to obtain predetermined voltages by serially connecting multiple charge pump circuits.

Moreover, a circuit assembly has been proposed which boosts a battery voltage to be two times larger (see Patent Document 2). However, the circuit assembly of Patent Document 2 has an object to provide a circuit assembly which can be satisfactory activated even though the battery voltage is low and/or the temperature is low. The circuit assembly of Patent Document 2 does not provide a solution of the above-described problem in which there is a charge pump capacitor which is not used when the wiring of the boosting charge pump circuit is switched so as to satisfy DDR1 specifications

[Patent Document 1] Japanese Patent Application, First Publication No. 2005-235315

[Patent Document 2] Japanese Patent Application, First Publication No. 2002-112532

As described above, the conventional boosting charge pump circuit is convenient because it is possible to switch between DDR1 and DDR2 specifications by switching the wirings inside the circuit. However, there is a problem in which, when the wiring is switched to DDR1 specifications, there is an unused charge pump capacitance which causes an area of the chip to be wasted.

SUMMARY OF THE INVENTION

The present invention was conceived in order to solve the above described problem. The present invention has an object to provide a boosting charge pump circuit which, even though a boosting method of the charge pump circuit is switched between DDR1 and DDR2 specifications, it is possible to avoid providing a charge pump capacitance (capacitor for the charge pump) which is not used. Therefore, by applying the present invention, it is possible to avoid having an unused area on a semiconductor chip. Moreover, by applying the present invention, a charge pump circuit is unitized. Therefore, the layout is easily designed.

The present invention was conceived in order to resolve the above-described problems. The following aspects are examples of the present invention.

A first aspect is a boosting charge pump circuit including multiple charge pump circuit units for boosting an external power supply voltage (VDD) in order to output an internal voltage (VPP) to an internal power line. In the first aspect, the charge pump circuit unit includes: a first connection switching terminal for selecting one of the power supply voltage (VDD) and a boost control voltage (VB); a charge pump capacitor; a boosting portion which charges the charge pump capacitor to be the power supply voltage (VDD), and which boosts the power supply voltage (VDD) or the boost control voltage (VB) selected by the first connection switching terminal by applying a charged voltage of the charge pump capacitor; a second switching terminal for determining whether a boosted voltage supplied by the boosting portion is outputted to the internal power line or is outputted as the boost control voltage (VB); and a boosted voltage output portion for outputting the boosted voltage to the internal power line if the second connection switching terminal has determined to output the boosted voltage to the internal power line.

In accordance with such a constitution, the boosting charge pump circuit of the first aspect is constituted from multiple charge pump circuit units. The charge pump circuit unit of the first aspect has a constitution in which one of the power source voltage (VDD) and the boost control voltage (VB) inputted from outside is selected, and the voltage charged in the charge pump capacitor is added to the selected voltage in order to boost the voltage. Moreover, the charge pump circuit unit of the first aspect has a constitution in which it is possible to select whether the voltage boosted by using the charge pump capacitor is outputted to the outside as the boost control voltage (VB) or to the internal power line as the internal voltage (VPP). Therefore, if the charge pump circuit is used for DDR1 specifications (which require a high power source voltage), outputs from the charge pump units are connected to the internal power line in parallel, a boost operation is conducted by adding a voltage of the charge pump capacitor to the power source voltage (VDD), and the boosted voltage is outputted to the internal power line. Moreover, if the charge pump circuit is used for DDR2 specifications (which require a low power source voltage), the charge pump units are connected in serial. In such a case, the charge pump circuit unit of an initial step conducts a boost operation by applying the voltage of the charge pump capacitor to the power source voltage (VDD), and outputs the boosted voltage as the boost control voltage (VB) to the charge pump circuit unit of a next step. In the next step, if the charge pump circuit unit is not included in the final step, the charge pump circuit unit boosts by adding a voltage of the charge pump capacitor to the boost control voltage outputted from the previous step, and outputs the boosted voltage as the new boost control voltage (VB) to the charge pump circuit unit of the following step. The charge pump circuit unit of the final step boosts by adding a voltage of the charge pump capacitor to the boost control voltage (VB) inputted from the previous step, and outputs the boosted voltage to the internal power line as the internal voltage (VPP).

In accordance with the above-described constitution, it is possible to apply the charge pump circuit of the first aspect to both DDR1 and DDR2 specifications by changing the number of charging pump circuit units and the connection constitution thereof which are fundamental constitutional elements. In such a case, all the charge pump capacitors of the charge pump circuit unit work for the boost operation. Therefore, it is possible to avoid providing a charge pump capacitance (capacitor for the charge pump) which is not used, and it is possible to avoid having an unused area on a semiconductor chip. Moreover, the charge pump circuit is unitized, and therefore, the layout is easily designed.

A second aspect is the above-described boosting charge pump circuit in which output terminals of the plurality of charge pump circuit units are connected to the internal power line in parallel, the first connection switching terminal selects the power source voltage (VDD), the boosting portion conducts a boosting operation of boosting twice as large as the power source voltage (VDD) by using the charge pump capacitor, the second connection switching terminal determines whether or not to output the boosted voltage to the internal power line, and the boosted voltage output portion outputs the boosted voltage to the internal power line.

In accordance with such a constitution, the boosting charge pump circuit of the second aspect is constituted in a manner in which output sides of multiple charge pump circuit units are connected to the internal power line in parallel. In each of the charge pump circuit units, the first connection switching terminal selects the power source voltage (VDD), and the power source voltage (VDD) is boosted by adding a voltage charged to the charge pump capacitor. Moreover, the second connection switching terminal selects whether or not to output the boosted voltage to the internal power line, and the boosted voltage is outputted to the internal power line as the internal voltage (VPP) via the boosted voltage output portion.

Therefore, it is possible to constitute a boosting charge pump circuit applied to DDR1 specifications by connecting the charge pump circuit units in parallel which are the fundamental constitutional elements. In such a case, all the charge pump capacitors of the charge pump circuit unit work for the boost operation. Therefore, it is possible to avoid providing a charge pump capacitance (capacitor for the charge pump) which is not used, and it is possible to avoid having an unused area on a semiconductor chip. Moreover, the charge pimp circuit is unitized, and therefore, the layout is easily designed.

A third aspect is the above-described boosting charge pump circuit in which the multiple charge pump circuit units are connected in series. With regard to the charge pump circuit unit of an initial step of a serial connection, the first connection switching terminal selects the power source voltage (VDD), the boosting portion conducts the boosting operation of boosting twice as large as the power source voltage (VDD), and the second connection switching terminal outputs the boosted voltage as the boosting control voltage (VB) to the following charge pump circuit unit. Moreover, with regard to the charge pump circuit unit of a intermediate step of the serial connection, the first connection switching terminal selects the boost control voltage (VB) outputted from a previously connected charge pump circuit unit in the serial connection, the boosting portion conducts a boosting operation by adding the power source voltage (VDD) to the boost control voltage (VB), and the second connection switching terminal selects a boosted voltage by the boosting portion as the boosting control voltage (VB) and outputs to the following charge pump circuit unit. Furthermore, with regard to the charge pump circuit unit of a last step of the serial connection, the first connection switching terminal selects the boost control voltage (VB) outputted from a previously connected charge pump circuit unit in the serial connection, the boosting portion conducts a boosting operation by adding the power source voltage (VDD) to the boost control voltage (VB), and the second connection switching terminal outputs a boosted voltage by the boosting portion to the internal power line.

In accordance with such a constitution, the boosting charge pump circuit of the third aspect has a constitution in which the multiple charge pump circuit units are connected in series. The charge pump circuit units have a constitution in which one of the power source voltage (VDD) and the boost control voltage (VB) inputted from the outside is selected by the first connection switching terminal, and the voltage charged in the charge pump capacitor (the power source voltage (VDD)) is added to the selected voltage in order to boost the voltage. Moreover, the charge pump circuit unit of the third aspect has a constitution in which, by using the second connection switching terminal, it is possible to select whether the voltage boosted by using the charge pump capacitor is outputted to the outside as the boost control voltage (VB) or to the internal power line as the internal voltage (VPP). If the charge pump circuit units are used in order to apply DDR2 specifications (the power source voltage (VDD) is low), the charge pump circuit units are connected in series.

In such a case, the charge pump circuit unit of an initial step selects the power source voltage (VDD) by using the first connection switching terminal, conducts a boost operation by applying the voltage of the charge pump capacitor to the power source voltage (VDD), and outputs the boosted voltage as the boost control voltage (VB) to the charge pump circuit unit of a next step by setting the second connection switching terminal. In the next step, if the charge pump circuit unit is not included in a final step, the power source voltage (VDD) is selected by using the first connection switching terminal, the charge pump circuit unit boosts by adding a voltage of the charge pump capacitor to the boost control voltage outputted from the previous step, and outputs the boosted voltage as the new boost control voltage (VB) to the charge pump circuit unit of a following step by setting the second connection switching terminal. With regard to the charge pump circuit unit of the final step, the boost control voltage (VB) is selected by using the first connection switching terminal, a boosting operation is conducted by adding a voltage of the charge pump capacitor to the boost control voltage (VB) inputted from the previous step, and the boosted voltage is outputted to the internal power line as the internal voltage (VPP) by setting the second connection switching terminal.

Therefore, it is possible to constitute a boosting charge pump circuit applied with DDR2 specifications by connecting the charge pump circuit units in series which are the fundamental constitutional elements. In such a case, all the charge pump capacitors of the charge pump circuit unit work for the boost operation. Therefore, it is possible to avoid providing a charge pump capacitance (capacitor for the charge pump) which is not used, and it is possible to avoid an unused area on a semiconductor chip. Moreover, a charge pump circuit is unitized, and therefore, a layout is easily designed.

A fourth aspect is a boosting charge pump circuit including first and second charge pump circuit units. The first and second charge pump circuit units each include: a first connection switching terminal selecting one of a power source voltage (VDD) and a boost control voltage (VB) which is inputted from the outside; a charge pump capacitor; a boosting portion which charges the charge pump capacitor to be the power supply voltage (VDD), and which boosts the power supply voltage (VDD) or the boost control voltage (VB) selected by the first connection switching terminal by applying a charged voltage of the charge pump capacitor; a second switching terminal for switching operations of outputting a boosted voltage supplied by the boosting portion to the internal power line and outputting the boosted voltage supplied by the boosting portion as the boost control voltage (VB) to the outside; and a boosted voltage output portion for outputting the boosted voltage to the internal power line if the second connection switching terminal has determined whether or not to output the boosted voltage to the internal power line. Moreover, the first connection switching terminal selects the power source voltage (VDD), the second connection switching terminal outputs the boosted voltage to the internal power line. Furthermore, the boosting charge pump circuit includes: a switching portion which connects and disconnects to both a side of outputting a boosted voltage from the charge pump capacitor of the first charge pump circuit unit and an output side of a boosted voltage from the charge pump capacitor of the second charge pump circuit unit; and a control portion which controls both the first and second charge pump circuit units in order to conduct both boosting and discharging operations alternately while having a predetermined interval, and turns on the switching portion during the predetermined interval.

In accordance with such a constitution, a boosting operation is conducted by adding the charged voltage of the charge pump capacitor to the power source voltage (VDD), and the boosted voltage is outputted to the internal power line as the internal voltage (VPP). Moreover, in accordance with such a constitution, the switching portion is provided which connects and disconnects to both a side of outputting a boosted voltage from the charge pump capacitor of the first charge pump circuit unit and a side of outputting a boosted voltage from the charge pump capacitor of the second charge pump circuit unit. Moreover, in accordance with such a constitution, a control portion is provided which controls both the first and second charge pump circuit units in order to conduct both boosting and discharging operations alternately while having a predetermined interval, and turns on the switching portion during the predetermined interval.

In accordance with such a constitution, it is possible to boost the voltage level of the internal voltage VPP so as to be approximately "(VPP+3×VDD)/2" by using a pair of the charge pump circuit units which are fundamental constitutional elements. Moreover, in accordance with such a constitution, it is possible to achieve the boosting charge pump circuit applied to DDR1 specifications by constantly turning off ("OFF") the switching portion.

In accordance with such a constitution, all the charge pump capacitors of the charge pump circuit unit work for the boost operation. Therefore, it is possible to avoid providing a charge pump capacitance (capacitor for the charge pump) which is not used, and it is possible to avoid having an unused area on a semiconductor chip. Moreover, the charge pump circuit is unitized, and therefore, the layout is easily designed.

A fifth aspect is a boosting charge pump circuit including multiple charge pump circuit units for boosting an external power supply voltage (VDD) in order to output an internal voltage (VPP) to an internal power line, wherein the boosting charge pump circuit includes a clock signal generation portion which generates a first clock signal (IN1), a second clock signal (IN2) and a third clock signal (IN3) for controlling operations of constitutional elements of the charge pump circuit unit. Moreover, the charge pump circuit includes: a first buffer gate (G1) inputting the first clock signal (IN1); a logically-inverting buffer gate (G2) inputting the second clock signal (IN2); a third buffer gate (G3) inputting the third clock signal (IN3) or a ground voltage; a capacitor (C1) which has a terminal to which an output of the first buffer gate (G1) is connected; a charge pump capacitor (C2) which has a terminal to which an output of the logically-inverting buffer gate (G2) is connected; a first NMOS transistor (M1) which has a gate terminal to which another terminal of the charge pump capacitor (C2) is connected, which has a drain terminal to which the power source voltage (VDD) is connected, and which has a source terminal to which another terminal of the capacitor (C1) is connected; a second NMOS transistor (M2) which has a gate terminal to which another terminal of the first capacitor (C1) is connected, which has a drain terminal to which the power source voltage (VDD) is connected, and which has a source terminal to which another terminal of the charge pump capacitor (C2) is connected; a third NMOS transistor (M3) which has a gate terminal to which another terminal of the first capacitor (C1) is connected, and which has a drain terminal to which the power source voltage (VDD) is connected; a fourth NMOS transistor (M4) which has a gate terminal to which a source terminal of the third NMOS transistor (M3) is connected; a first connection switching terminal (SW1) for selecting a supply power voltage which is one of the power source voltage (VDD) and a boost control voltage (VB) supplied from the outside and is connected to the logically-inverting buffer gate (G2); a second connection switching terminal (SW2) for selecting one of the third clock signal (IN3) and a ground voltage as an input which is connected to the third buffer gate (G3); a third connection switching terminal (SW3) for determining whether a voltage of another terminal of the charge pump capacitor (C2) is outputted to the outside as the boost control voltage (VB) or connected to a drain terminal of the fourth NMOS transistor (M4); a fourth connection switching terminal (SW4) for selecting whether or not a source terminal of the fourth NMOS transistor (M4) is connected to the internal power line; a third capacitor (C3) which has a terminal to which a source terminal of the third NMOS transistor (M3) and a gate terminal of the fourth NMOS transistor (M4) are connected; and a level converter (LC) which inputs both an output voltage of the third buffer gate (G3) which is the power source voltage (VDD) and the internal voltage (VPP) and outputs a signal obtained by adding both the power source voltage (VDD) and the internal voltage (VPP) to another terminal of the third capacitor (C3).

The above-described boosting charge pump circuit of the fifth aspect is constituted from multiple charge pump circuit units. In the above-described charge pump circuit unit, one of the power source voltage (VDD) and the boost control voltage (VB) inputted from the outside is selected by the first connection switching terminal (SW1), and the selected voltage is a supply source voltage (circuit voltage) of the logically-inverting buffer gate (G2). Moreover, the boosting portion charges the charge pump capacitor to the power supply voltage (VDD) when the second clock signal (IN2) is "HIGH", and boosts by adding the charged voltage (power source voltage (VDD)) of the charge pump capacitor (C2) when the second clock signal (IN2) is "LOW". Moreover, a third connection switching terminal (SW3) determines whether the boosted voltage is outputted to the outside as the boost control voltage (VB) or outputted to the internal power line as the internal voltage (VPP) via the fourth NMOS transistor (M4). If the boosted voltage is outputted as the internal voltage (VPP), the third clock signal (IN3) is outputted to the third buffer gate (G3) via the second connection switching terminal (SW2), the fourth NMOS transistor (M4) is turned on because of operations of the level converter (LC), the third capacitor (C3) and the third NMOS transistor (M3) when the third clock signal (IN3) is "HIGH", and the charged voltage of the charge pump capacitor (C2) is outputted to the internal voltage (VPP) via the fourth NMOS transistor (M4). It should be noted that the first clock signal (IN1), the first buffer gate (G1) and the first NMOS transistor (M1) have functions for charging and boosting the first capacitor (C1), and the voltage of the first capacitor (C1) is boosted and the second NMOS transistor (M2) us turned on when the first clock signal (IN1) is "HIGH".

In accordance with the above-described constitution, it is possible to apply the charge pump circuit of the first aspect to both DDR1 and DDR2 specifications by changing the connection constitution of the multiple charge pump circuit units which are fundamental constitutional elements. In such a case, all the charge pump capacitors of the charge pump circuit unit work for the boost operation. Therefore, it is possible to avoid providing a charge pump capacitance (capacitor for the charge pump) which is not used, and it is possible to avoid having an unused area on a semiconductor chip. Moreover, the charge pump circuit is unitized, and therefore, the layout is easily designed.

A sixth aspect is a boosting charge pump circuit including first and second charge pump circuit units, wherein each of the charge pump circuit units include: a first buffer gate (G1) inputting the first clock signal (IN1); a logically-inverting buffer gate (G2) inputting the second clock signal (IN2); a third buffer gate (G3) inputting the third clock signal (IN3) or a ground voltage; a capacitor (C1) which has a terminal to which an output of the first buffer gate (G1) is connected; a capacitor for charge pump (C2) which has a terminal to which an output of the logically-inverting buffer gate (G2) is connected; a first NMOS transistor (M1) which has a gate terminal to which another terminal of the capacitor for charge pump (C2) is connected, which has a drain terminal to which the power source voltage (VDD) is connected, and which has a source terminal to which another terminal of the capacitor (C1) is connected; a second NMOS transistor (M2) which has a gate terminal to which another terminal of the first capacitor (C1) is connected, which has a drain terminal to which the power source voltage (VDD) is connected, and which has a source terminal to which another terminal of the capacitor for charge pump (C2) is connected; a third NMOS transistor (M3) which has a gate terminal to which another terminal of the first capacitor (C1) is connected, and which has a drain terminal to which the power source voltage (VDD) is connected; a fourth NMOS transistor (M4) which has a gate terminal to which a source terminal of the third NMOS transistor (M3) is connected; a first connection switching terminal (SW1) for selecting a supply power voltage which is one of the power source voltage (VDD) and a boost control voltage (VB) supplied from the outside and is connected to the logically-inverting buffer gate (G2); a second connection switching terminal (SW2) for selecting one of the third clock signal (IN3) and a ground voltage as an input which is connected to the third buffer gate (G3); a third connection switching terminal (SW3) for determining whether a voltage of another terminal of the capacitor for charge pump (C2) is outputted to the outside as the boost control voltage (VB) or connected to a drain terminal of the fourth NMOS transistor (M4); a fourth connection switching terminal (SW4) for selecting whether or not a source terminal of the fourth NMOS transistor (M4) is connected to the internal power line; a third capacitor (C3) which has a terminal to which a source terminal of the third NMOS transistor (M3) and a gate terminal of the fourth NMOS transistor (M4) are connected; and a level converter (LC) which inputs both an output voltage of the third buffer gate (G3) which is the power source voltage (VDD) and the internal voltage (VPP) and outputs a signal obtained by adding both the power source voltage (VDD) and the internal voltage (VPP) to another terminal of the third capacitor (C3). Moreover, the first connection switching terminal (SW1) selects the power source voltage (VDD), and the third connection switching terminal (SW3) outputs a boosted voltage of the capacitor for charge pump (C2) to the fourth NMOS transistor (M4). Furthermore, the boosting charge pump circuit includes: a fifth NMOS transistor (M5) which is connected to both a terminal of the second capacitor (C2) of the first charge pump circuit unit that is a terminal connected to the third connection switching terminal (SW3) and a terminal of the second capacitor (C2) of the second charge pump circuit unit that is a terminal connected to the third connection switching terminal (SW3); a fourth buffer gate (G4) which inputs a fourth clock signal (IN4) or a ground voltage and a supply source voltage of the fourth buffer gate (G4) is the internal voltage VPP; a fifth connection switching terminal (SW5) which determines an input of the fourth buffer gate (G4) selected from the fourth clock signal (G4) and the ground voltage; and a clock signal generation portion which generates the first clock signal (IN1), the second clock signal (IN2) and the third clock signal (IN3) for controlling operations of the first and second charge pump circuit units in a manner in which both the first and second charge pump circuit units conduct both boosting and discharging operations alternately while having a predetermined interval, and generates the fourth clock signal (IN4) for turning on the fifth NMOS transistor (M5) during the predetermined interval.

The above-described boosting charge pump circuit is constituted from a pair of charge pump circuit units. In such a charge pump circuit unit, the power source voltage (VDD) is selected by the first connection switching terminal and is used as the supply source voltage (circuit voltage) of the logically-inverting buffer gate (G2). Moreover, the charge pump capacitor (C2) is charged to the power supply voltage (VDD) by using the NMOS transistor (M2) when the second clock signal (IN2) is "HIGH", and a boosting operation is conducted by adding the charged voltage (power source voltage (VDD)) of the charge pump capacitor (C2) when the second clock signal (IN2) is "LOW". Moreover, when the second clock signal (IN2) is "LOW", a clock signal (IN3) is set to "HIGH", the fourth NMOS transistor (M4) is turned on ("ON"), and the internal voltage VPP is generated by outputting the charged voltage of the charge pump capacitor (C2) to the internal power line via the NMOS transistor (M4).

Moreover, the clock signal generation portion generates the first clock signal (IN1), the second clock signal (IN2) and the third clock signal (IN3) for controlling operations of a pair of the charge pump circuit units in a manner in which both the charge pump circuit units conduct both boosting and discharging operations alternately while having a predetermined interval. Moreover, during the predetermined interval of a pair of the charge pump circuit units, the clock signal generation portion generates the fourth clock signal (IN4) for turning on the fifth NMOS transistor (M5) which is connected to both a side of outputting a boosted voltage from the charge pump capacitor (C2) of the first charge pump circuit unit and a side of outputting a boosted voltage from the charge pump capacitor (C2) of the second charge pump circuit unit. In accordance with such a constitution, it is possible to boost the voltage level of the internal voltage VPP so as to be approximately "(VPP+3×VDD)/2". Moreover, if it is necessary, it is possible to provide the boosting charge pump circuit (2×VDD>VPP>VDD) by constantly turning off the NMOS transistor (M5).

In accordance with such a constitution, it is possible to boost the voltage level of the internal voltage VPP so as to be approximately "(VPP+3×VDD)/2" by using a pair of the charge pump circuit units which are fundamental constitutional elements. In such a case, all the charge pump capacitors of the charge pump circuit unit work for the boost operation. Therefore, it is possible to avoid providing a charge pump capacitance (capacitor for the charge pump) which is not used, and it is possible to avoid having an unused area on a semiconductor chip. Moreover, the charge pump circuit is unitized, and therefore, the layout is easily designed.

The boosting charge pump circuit of the present invention has an advantage in which, even though a boosting method of the charge pump circuit is switched between DDR1 and DDR2 specifications, it is possible to avoid providing a charge pump capacitance (capacitor for the charge pump) which is not used. Therefore, it is possible to avoid having an unused area on a semiconductor chip. Moreover, in the present invention, the charge pump circuit is unitized. Therefore, the layout is easily designed.

DETAILED DESCRIPTION OF THE INVENTION

Hereinafter, in reference to the drawings, the following embodiments are explained which are examples that describe the present invention.

FIRST EMBODIMENT

Boosting Charge Pump Circuit Applied to DDR1 Specifications

Figure 1:
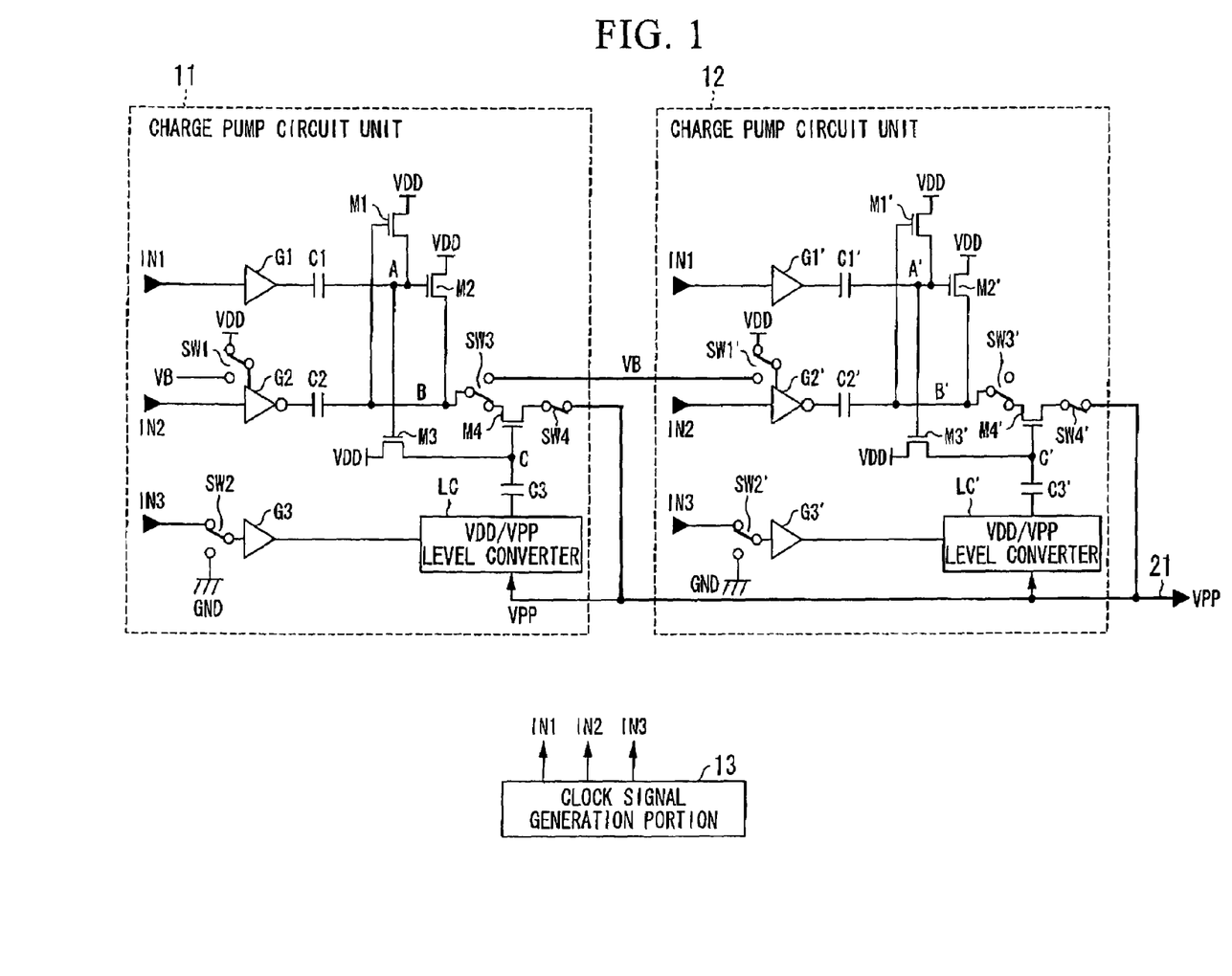
FIG. 1 is a drawing which shows a constitution of a boosting charge pump circuit of a first embodiment.

FIG. 1 is a drawing which shows a constitution of a boosting charge pump circuit of a first embodiment. FIG. 1 shows an example of a boosting charge pump circuit which is applied with DDR1 specifications (for example, a power supply voltage is 2.5V).

The boosting charge pump circuit shown in FIG. 1 is constituted from two charge pump circuit units 11 and 12. Both the charge pump circuit units 11 and 12 have the same constitution. The power supply voltage (external power supply voltage) VDD is boosted by operating both the charge pump circuit units 11 and 12 in parallel so as to adjust the internal voltage (internal power supply voltage) VPP of the internal power line 21 in a range of "2×VDD>VPP>VDD".

With regard to the charge pump unit 11 shown in FIG. 1, clock signals IN1, IN2 and IN3 have different phases. A clock signal generation portion 13 generates the clock signals IN1, IN2 and IN3. Transistors M1, M2, M3 and M4 are NMOS transistors (N-Channel MOSFET). C1, C2 and C3 are capacitors. In particular, the capacitor C2 is a capacitor for the charge pump that generates the internal voltage VPP by boosting and discharging. G1 and G3 are buffer gates. G2 is a logically-inverting buffer gate SW1, SW2, SW3 and SW4 are connection switching terminals for switching the connections of the wirings.

It should be noted that the constitution of the circuit of the charge pump circuit unit 12 is the same as the constitution of the charge pump circuit unit 11. However, (dash) is applied to each of the constitutional elements of the charge pump circuit unit 12 in order to be easily distinguished from the constitutional elements of the charge pump circuit unit 11.

The buffer gate G1 inputs the clock signal IN1. One terminal of the capacitor C1 is connected to an output of the buffer gate G1. Another terminal of the capacitor C1 is connected to a source terminal of the NMOS transistor M1 and gate terminals of the NMOS transistors M2 and M3. Moreover, drain terminals of the transistors M1 and M2 are connected to the power supply voltage VDD.

The logically-inverted buffer gate G2 inputs the clock signal IN2. One terminal of the capacitor C2 is connected to an output of the logically inverted-buffer gate G2. Another terminal of the capacitor C2 is connected to a gate terminal of the NMOS transistor M1, a source terminal of the NMOS transistor M2 and the connection switching terminal SW3. Moreover, with regard to a supply source voltage (circuit voltage) which is supplied to the logically-inverted buffer gate G2, it is possible to switch the supply source voltage between the power supply voltage VDD and a boost control voltage VB by using the connection switching terminal SW1.

A drain terminal of the NMOS transistor M4 is connected to a switching terminal of the connection switching terminal SW3. A source terminal of the NMOS transistor M4 is connected to an internal power line 21 via the connection switching terminal SW4. Moreover, a gate terminal of the NMOS transistor M4 is connected to both a source terminal of the NMOS transistor M3 and one terminal of the capacitor C3. Another terminal of the capacitor C3 is connected to an output terminal of a level converter LC. Moreover, a drain terminal of the NMOS transistor M3 is connected to the power supply voltage VDD.

The buffer gate G3 inputs the clock signal IN3 via the connection switching terminal SW2. The level converter LC inputs a signal outputted from the buffer gate G3. In order to turn "ON" the NMOS transistor M4, the level converter LC raises a voltage level at the point C so as to be "VDD+VPP" through the capacitor C3 when the clock signal IN3 is "HIGH" (HIGH being the level of the power source voltage VDD).

It should be noted that the above-described first connection switching terminal corresponds to the connection switching terminal SW1, and the power source voltage VDD or the boost control voltage VB is selected by the connection switching terminal SW1. The voltage selected by the connection switching terminal SW1 is the supply source voltage (circuit voltage) supplied to the logically-inverted buffer gate G2 Moreover, the above-described boost portion corresponds to the logically-inverted buffer gate G2, the capacitor C2 for the charge pump, the NMOS transistor M2, and the like. The boost portion conducts a boost operation in which the charged voltage (VDD) of the capacitor C2 is increased by using the output voltage of the logically-inverted buffer gate G2 (the power source voltage VDD or the boost control voltage VB). The second connection switching terminal corresponds to the connection switching terminal SW3. By using the connection switching terminal SW3, it is possible to switch whether the (boosted) voltage of the capacitor C2 is outputted as the boost control voltage VB or outputted to the internal power line 21 via the NMOS transistor M4.

Moreover, the above-described boosted voltage output portion corresponds to the NMOS transistors M3 and M4, the capacitance C3, level converter LC, and the like. If the NMOS transistor M4 is turned on, the voltage of the capacitance C3 is outputted to the internal power line 21.

Figure 2:
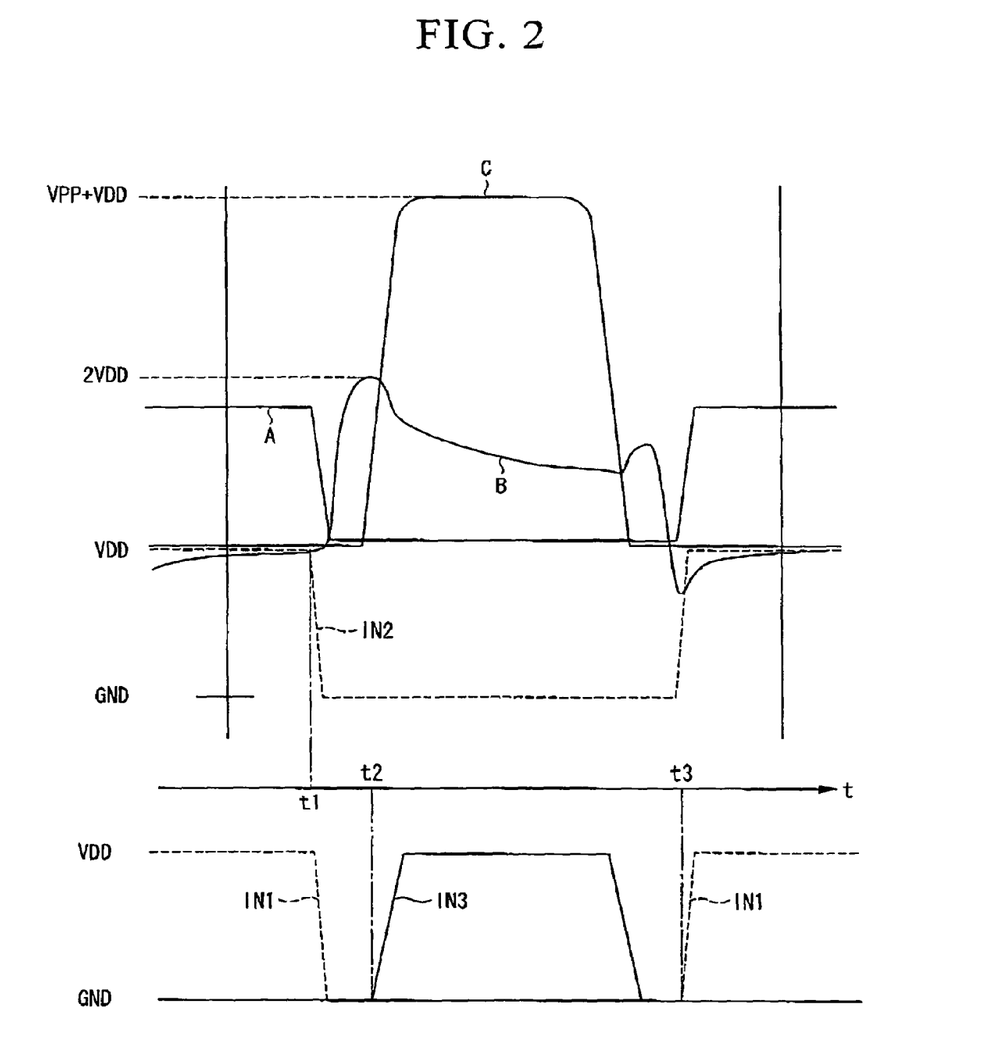
FIG. 2 is a time chart for explaining operations of the boosting charge pump circuit shown in FIG. 1.

FIG. 2 is a time chart for explaining operations of the boosting charge pump circuit shown in FIG. 1. Hereinafter, in reference to FIG. 2, operations of the circuit of FIG. 1 are explained.

With regard to charge pump circuit unit 11, at a time t1 and before, the clock signals IN1 and IN2 are "HIGH" (HIGH being the level of the power source voltage VDD). Therefore, the voltage level at the point A to which the capacitor C1 is connected is approximately "2×VDD" because both the voltage VDD charged at the capacitor C1 and the output voltage of the buffer gate G1 are added. In such a state, the NMOS transistors M2 and M3 are set to "ON".

Moreover, the IN2 is "HIGH". Therefore, a side or a terminal of the capacitor C2 to which the logically-inverting buffer gate G2 is "LOW" (LOW being level of ground). The voltage at the point B at which the capacitor C2 and the source terminal of the NMOS transistor M2 are connected is VDD because the capacitor C2 is charged by the NMOS transistor M2. Moreover, in such a state, the NMOS transistor M3 is "ON", and therefore, the voltage at the point C close from the capacitor C3 is VDD.

When the time is t2 under the above-described state, the clock signals IN1 and IN2 are "LOW", and the clock signal IN3 starts changing to "HIGH" level. When the clock signal IN2 is "HIGH", the output voltage of the logically-inverting buffer gate G2 is "HIGH" (VDD). The voltage at the point B is "2×VDD" by adding both the output voltage (VDD) of the logically-inverting buffer gate G2 and the charged voltage of the capacitor C2.

Moreover, when the clock signal IN 3 is "HIGH", both the voltage VDD charged at the capacitor C3 and the internal voltage VPP are added. Therefore, the voltage at the point C is raised to "VDD+VPP", and the NMOS transistor M4 is turned on (set to "ON").

When the NMOS transistor M4 is set to "ON", discharging is started via the connection switching terminal SW3, the NMOS transistor M4 and the connection switching terminal SW4, and the internal voltage VPP is applied at the internal power line 21. Moreover, after the time t3, the above-described operations are repeated.

Likewise, operations of the charge pump circuit unit 12 are the same as the above-described operations As described above, the outputs of the charge pump circuit units 11 and 12 which have the same constitution are connected in parallel, and it is possible to constitute the boosting charge pump circuit applied with DDR1 specifications (2×VDD>VPP>VDD).

In an example shown in FIG. 1, a case is explained in which a pair of the charge pump circuits is connected with each other in parallel. However, this is not a limitation and it is possible to apply 3 or more charge pump circuit units.

SECOND EMBODIMENT

A Case of Being Applied to DDR2 Specifications

Figure 3:
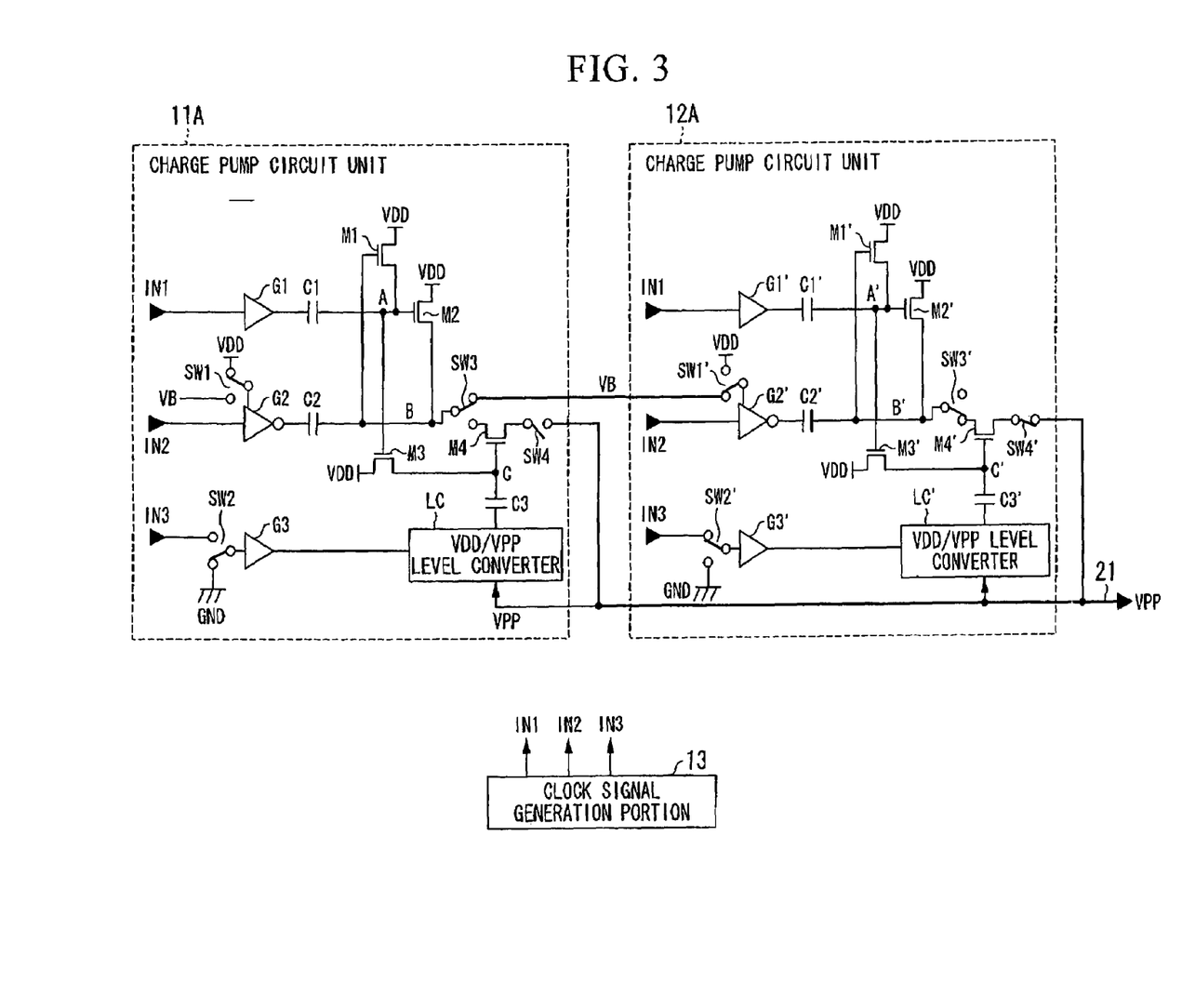
FIG. 3 is a drawing which shows a constitution of a boosting charge pump circuit of a second embodiment.

FIG. 3 is a drawing which shows a constitution of a boosting charge pump circuit of a second embodiment. FIG. 1 shows an example of a boosting charge pump circuit which is applied with DDR2 specifications (for example, the power supply voltage is 1.8 V).

The boosting charge pump circuit shown in FIG. 3 is constituted from two charge pump circuit units 11A and 12A. Both the charge pump circuit units 11A and 12A are connected in serial so as to adjust the internal voltage VPP of the internal power line 21 in a range of "3×VDD>VPP>2×VDD".

Constitutions of the charge pump circuit units 11A and 12A are substantially the same as the charge pump circuit units 11 and 12 respectively shown in FIG. 1. Connection statuses of the wiring of the connection switching terminals SW1-SW4 and SW1'-SW4' are partially different between the charge pump circuit units 11A/12B and 11/12.

With regard to the above-described differences, the connection switching terminal SW2 is arranged and connected so as to connect the input of the buffer gate G3 to ground. The connection switching terminal SW3 is connected in a manner in which the boosted voltage outputted from a terminal or side (point B) of the capacitor C2 is outputted as the boost control voltage VB toward the charge pump circuit unit 12A.

Moreover, in the charge pump circuit unit 12A, the connection switching terminal SW1' is arranged and connected so as to select the boost control voltage VB. Therefore, the voltage at the point B of the charge pump circuit unit 11A is applied as the supply source voltage (circuit voltage) of the logically-inverting buffer gate G2'. Moreover, the connection switching terminal SW2' is arranged and connected so as to supply the clock signal IN3 as the input of the buffer gate G3'. The connection switching terminal SW2' is arranged and connected in a manner in which the voltage at the point B' to which the capacitor C2' is connected is applied to the drain terminal of the NMOS transistor M4'. Moreover, the connection switching terminal SW4' is arranged and connected in a manner in which the source terminal of the NMOS transistor M4' is connected to the internal power line 21.

Figure 4:
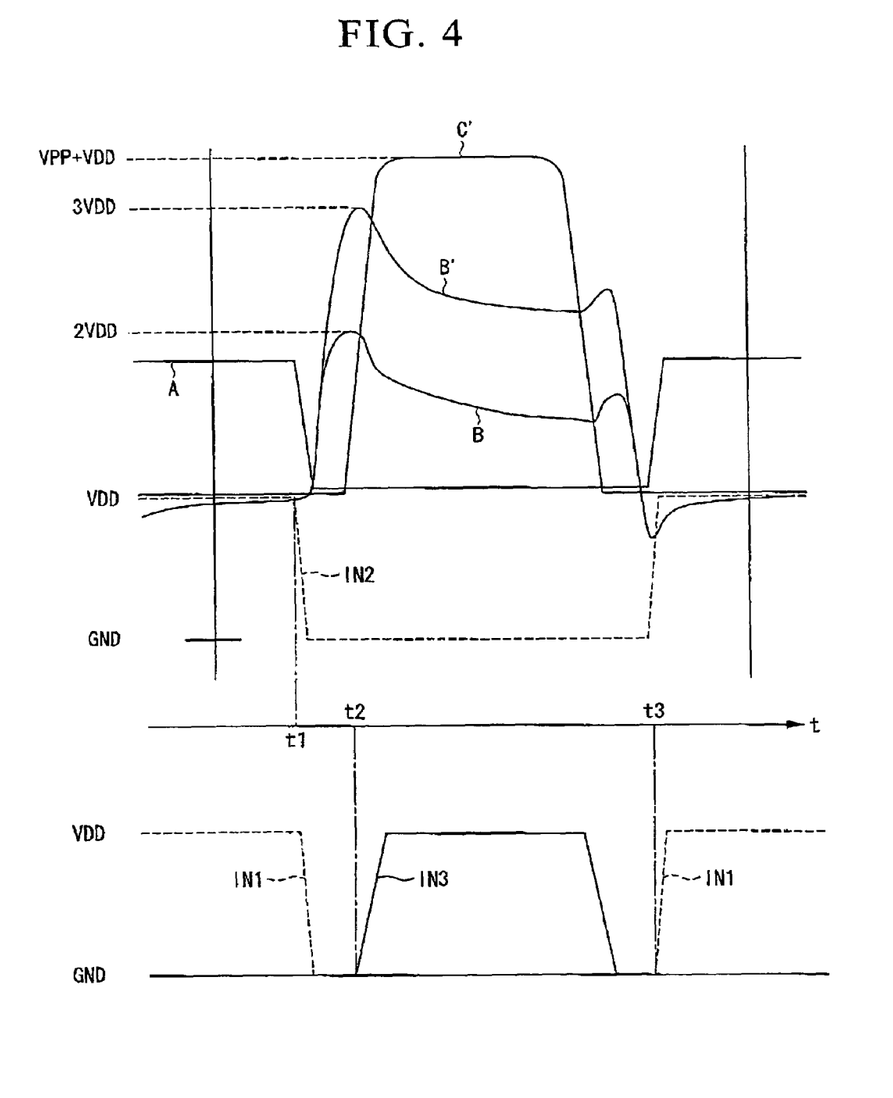
FIG. 4 is a time chart for explaining operations of the boosting charge pump circuit shown in FIG. 3.

FIG. 4 is a time chart for explaining operations of the boosting charge pump circuit shown in FIG. 3. Hereinafter, in reference to FIG. 4, operations of the circuit of FIG. 3 are explained.

At a time t1 and before, the clock signals IN1 and IN2 are "HIGH". Therefore, in the charge pump circuit unit 11A, the voltage level at the point A to which the capacitor C1 is connected is boosted and is approximately "2×VDD" because the IN1 is "HIGH" and both the voltage charged at the capacitor C1 and the output voltage of the buffer gate G1 are added.

Moreover, the IN2 is "HIGH". Therefore, a side of the capacitor C2 to which the logically-inverting buffer gate G2 is "LOW" (being a ground level, that is, GND). The voltage at the point B close to the capacitor C2 is VDD because the capacitor C2 is charged by the NMOS transistor M2.

Likewise, with regard to the charge pump circuit unit 12, the voltage level at the point A' to which the capacitor C1' is connected is boosted and is approximately "2×VDD" because the IN1 is "HIGH" and both the voltage charged at the capacitor C1' and the output voltage of the buffer gate G1' are added.

Moreover, the IN2 is "HIGH" level. Therefore, a side or a terminal of the capacitor C2' to which the logically-inverting buffer gate G2' is "LOW" (being a ground level, that is, GND). The voltage at the point B' close to the capacitor C2' is VDD because the capacitor C2' is charged by the NMOS transistor M2'. Moreover, the gate terminal of the NMOS transistor M3' is connected to the point A'. Therefore, the NMOS transistor M3' is "ON", and the voltage of the point C' close to the capacitor C3' is VDD.

When the time t2 is under the above-described state, the clock signals IN1 and IN2 are "LOW", and the clock signal IN3 starts changing to "HIGH".

In the charge pump circuit unit 11A, when the clock signal IN2 is "HIGH", the output voltage of the logically-inverting buffer gate G2 is "HIGH". Therefore, the voltage at the point B close to the capacitor C2 is boosted and is "2×VDD".

The voltage at the point B of the charge pump circuit unit 11A is outputted to the charge pump circuit unit 12A as the boost control voltage VB via the connection switching terminal SW3. The boost control voltage VB is applied as the supply source voltage (circuit voltage) of the logically-inverting buffer gate G2' via the connection switching terminal SW1' of the charge pump circuit unit 12A.

Therefore, in the charge pump circuit unit 12A, when the clock signal IN2 is "LOW", the output of the logically-inverting buffer gate G2' is "HIGH" (2×VDD). Moreover, the output voltage (2×VDD) is added to the charged voltage (VDD) of the capacitor C2', and the voltage at the point B' is "3×VDD".

Moreover, when the clock signal IN3 is "HIGH", the internal voltage VPP is added to the charged voltage VDD of the capacitor C3', the voltage level of the point C' is "VDD+VPP", and the NMOS transistor M4' is turned on (is set to "ON").

When the NMOS transistor M4' is turned on, discharging by using the charged voltage (voltage of the point B') of the capacitor C2' is started via the connection switching terminal SW3', NMOS transistor M4' and the connection switching terminal SW4', and the internal voltage VPP is caused on the internal power line 21. Moreover, after the time t3, the above-described operations are repeated.

As described above, the charge pump circuit units 11A and 12A which have the same constitution are connected in serial. Therefore, it is possible to constitute the boosting charge pump circuit which is applied with DDR2 specifications (3×VDD>VPP>2×VDD)

In an example shown in FIG. 3, a case is explained in which a pair of the charge pump circuits is connected each other in serial. However, this is not a limitation and it is possible to apply 3 or more charge pump circuit units. In such a case, the internal voltage is outputted to the internal power line 21 from the charge pump circuit unit which is connected at the end of the series.

As explained in examples of the above-described first and second embodiments, with regard to the boosting charge pump circuit of the present invention, each of the charge pump circuit units is constituted as a fundamental unit, and it is possible to flexibly change the output voltage of the charge pump by connecting multiple charge pump circuits because the boosting method is changed. Moreover, in accordance with the above-described embodiments, capacity of all the charge pumps is used without being wasted. Therefore, it is possible to avoid the problem of the conventional technique in which there is a charge pump capacitance (capacity of the charge pump) which is not used when the boosting method of the charge pump is changed, and in which there is an area on a semiconductor chip that is not used. That is, in accordance with the above-described embodiments, it is possible to increase the boosting ability of the charge pump even though the size of the semiconductor chip is the same as that of the conventional technique.

THIRD EMBODIMENT

Figure 5:
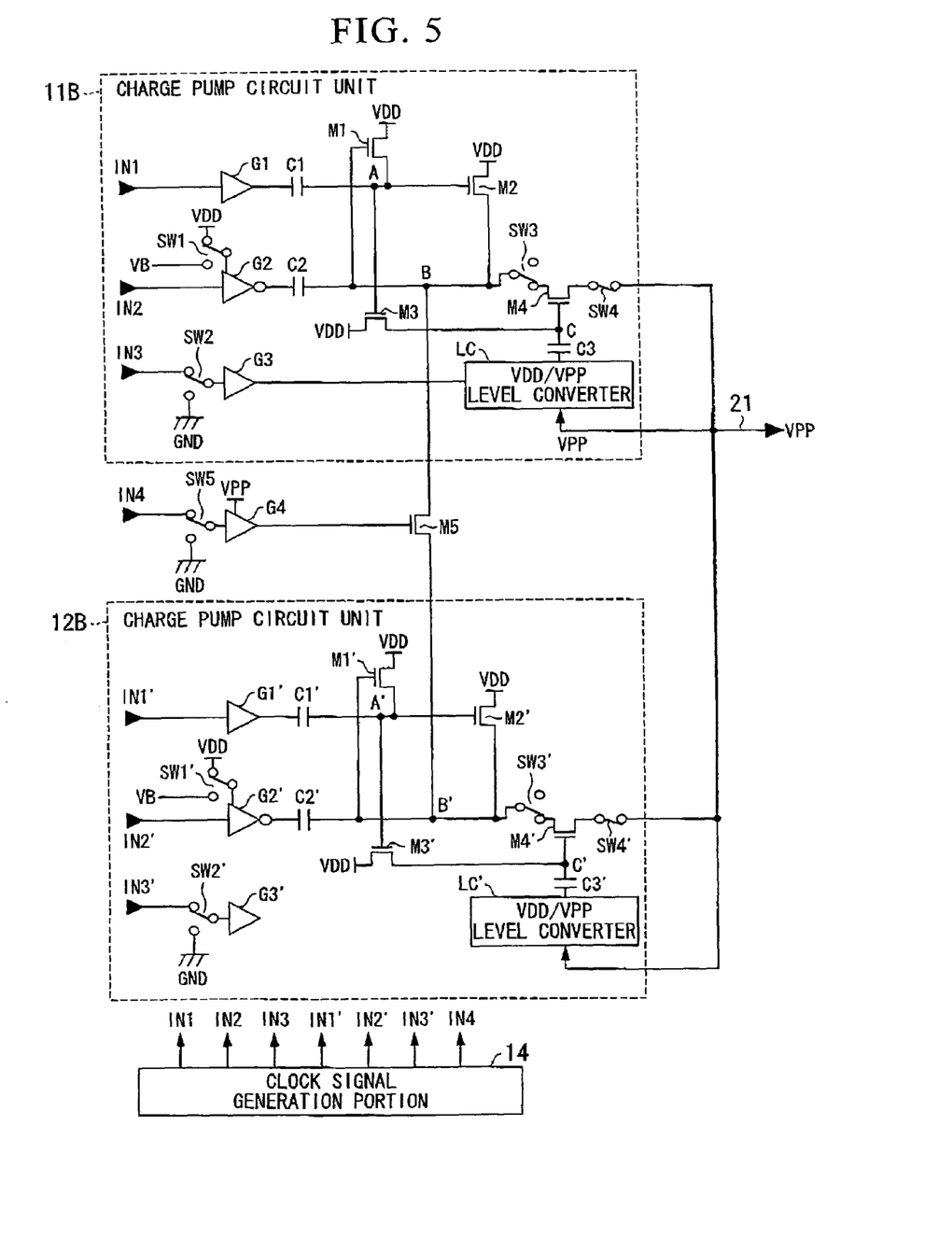
FIG. 5 is a drawing which shows a constitution of a boosting charge pump circuit of a third embodiment.

FIG. 5 is a drawing which shows a constitution of a boosting charge pump circuit of a third embodiment.

In the boosting charge pump circuit shown in FIG. 5, constitutions of the charge pump circuit units 11B and 12B are substantially the same as the charge pump circuit units 11 and 12 respectively shown in FIG. 1 which satisfies DDR1 specifications.

The following points of the boosting charge pump circuit shown in FIG. 5 are different form the boosting charge pump circuit shown in FIG. 1. An NMOS transistor M5 is inserted between the point B at which the capacitor C2 of the charge pump circuit unit 11B is connected and the point B' at which the capacitor C2' of the charge pump circuit unit 12B is connected. Moreover, a clock signal IN4, a connection switching terminal SW5 and a buffer gate G4 are added. It should be noted that, with regard to the buffer gate G4, the supply source voltage (circuit voltage) is the internal voltage VPP. Moreover, the clock signal generation portion 14 generates the clock signals IN1, IN2 and IN3 which are outputted to the charge pump circuit unit 11B, the clock signals IN1', IN2' and IN3' which are outputted to the charge pump circuit unit 12B and the clock signal IN4.

The clock signal IN4 is outputted to the buffer gate G4 via the connection switching terminal SW5. The buffer gate G4 is activated by using the internal voltage VPP, and the output of the buffer gate G4 is connected to a gate terminal of the NMOS transistor M5.

In the above-described constitution, in order to adjust the voltage level of the internal voltage VPP so as to be "2×VDD>VPP>VDD", the connection switching terminal SW5 is connected to a side of the ground (GND), the input signals of the buffer gate G4 are continuously set to "LOW" (being a ground level), and the NMOS transistor M5 is constantly set to "OFF". Therefore, the charge pump circuit units 11B and 12B independently conduct operations. That is, if the NMOS transistor M5 is turned off ("OFF"), as a result, the constitution and the operation of the charge pump circuit of this embodiment is the same as the charge pump circuit shown in FIG. 1.

On the other hand, in order to boost the voltage level of the internal voltage VPP so as to be approximately "(VPP+3×VDD)/2", the buffer gate G4 inputs the clock signal IN4, and both a side or a terminal of the capacitor C2 of the charge pump circuit unit 11B from which the boosted voltage is outputted and a side or a terminal of the capacitor C2' of the charge pump circuit unit 12B from which the boosted voltage is outputted are connected in parallel at each predetermined time via the NMOS transistor M5. In accordance with such a constitution, it is possible to boost the voltage level of the internal voltage VPP so as to be approximately "(VPP+3×VDD)/2".

It should be noted that the above-described switching portion corresponds to the NMOS transistor M5, and the control portion corresponds to the clock signal generation portion 14.

Figure 6:
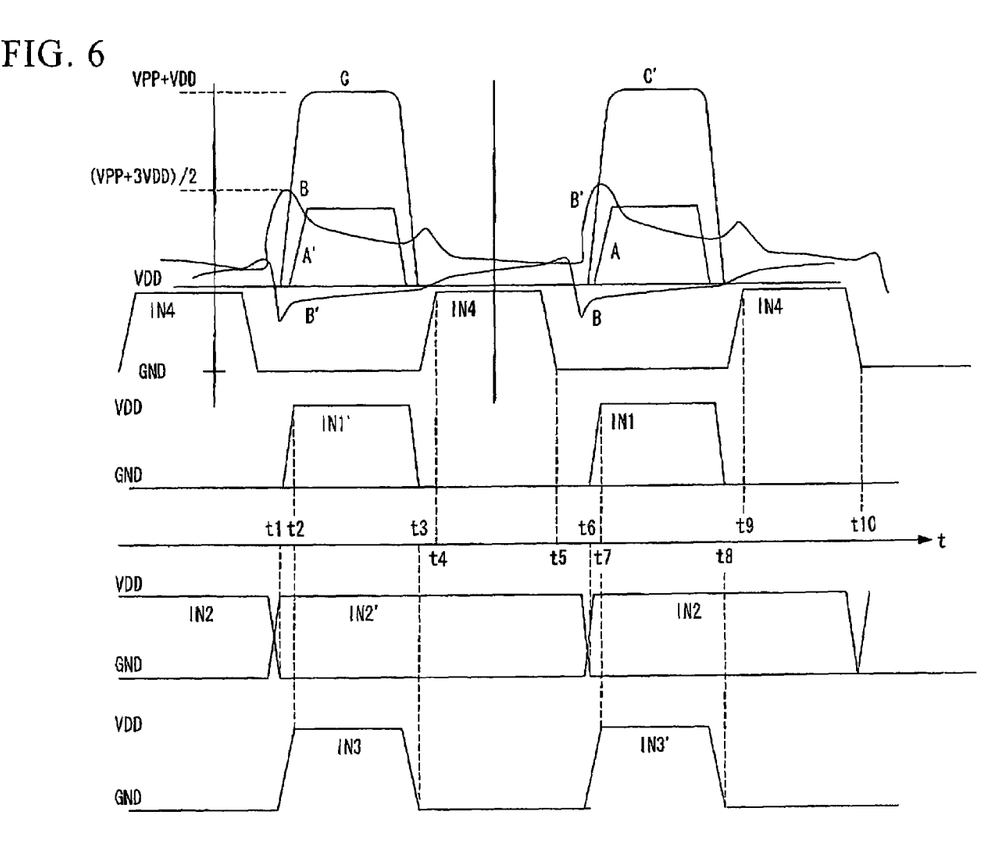
FIG. 6 is a time chart for explaining operations of the boosting charge pump circuit shown in FIG. 5.

FIG. 6 is a time chart for explaining operations of the boosting charge pump circuit shown in FIG. 5. Hereinafter, in reference to FIG. 6, operations of the circuit of FIG. 5 are explained.

When the clock signal IN2 is "LOW" at the time t1, in the charge pump circuit unit 11B, the output of the logically-inverting buffer gate G2 is "HIGH". Therefore, the voltage at the point B close to the capacitor C2 is raised to "(VPP+3×VDD)/2". The reason why such a phenomena is caused is explained later.

Moreover, at the time t2, when the clock signal IN3 is "HIGH", due to operations of the level converter LC, the internal voltage VPP is added to the voltage of the capacitor C3 which is charged so as to be the source voltage VDD beforehand. Therefore, the voltage at the point C is "VPP+VDD". In accordance with such operations, the NMOS transistor M4 is turned "ON", the discharged current from the capacitor C2 is applied to the internal power line 21 via the NMOS transistor M4, and therefore, the internal voltage VPP is obtained.

Moreover, at the time t2, the clock signal IN1' is "HIGH", and the point A' of the charge pump circuit unit 12B is "2×VDD" by adding the charged voltage of the capacitor C1'. Therefore, the NMOS transistor M2' is turned on (set to "ON"). Moreover, at this time, the output of the logically-inverted buffer gate G2' is "LOW" because the clock signal IN2' is "HIGH", and the voltage of the capacitor C2' (voltage of the point B') is charged so as to be the power source voltage VDD.

After that, at the time t3, the clock signal IN3 is "LOW", and the NMOS transistor M4 is turned "OFF". At this time, the voltage at the point B of the charge pump circuit unit 11B is the internal voltage VPP.

Moreover, at the time t4, when the clock signal IN4 is "HIGH" and the NMOS transistor M5 is turned on (set to "ON"), there is a current in a direction from the point B of the charge pump circuit unit 11B to the point B' of the charge pump circuit unit 12B. Furthermore, at the time t5 at which the clock signal IN4 is changed to the "LOW", the voltage at the points B and B' are "(VPP+VDD)/2".

Next, at the time t6, the clock signal IN2' of the charge pump circuit unit 12B is "LOW" (clock signal IN2 is "HIGH"), the output of the logically-inverted buffer gate G2' is "HIGH" (VDD). Therefore, at the point B', the voltage "(VPP+3×VDD)/2" is obtained by adding the voltage "(VPP+VDD)/2" charged at the capacitor C2'.

Moreover, at the time t7, when the clock signal IN3' is "HIGH", due to operations of the level converter LC', the internal voltage VPP is added to the voltage of the capacitor C3' which is charged to the source voltage VDD beforehand. Therefore, the voltage at the point C' is "VPP+VDD". In accordance with such operations, the NMOS transistor M4' is turned "ON", the discharged current from the capacitor C2' is applied to a side or a terminal of outputting via the NMOS transistor M4', and therefore, the internal voltage VPP is obtained at the internal power line 21.

Moreover, at the time t7, the clock signal IN1 is "HIGH", and the point A of the charge pump circuit unit 11B is "2×VDD" by adding the charged voltage of the capacitor C1 to the output voltage of the buffer gate G1. Therefore, the NMOS transistor M2 is turned on (set to "ON"), and the capacitor C2 is charged so as to be the source voltage VDD.

After that, at the time t8, the clock signal IN3 is "LOW", and the NMOS transistor M4' is turned "OFF". At this time, the voltage level of the point B' of the charge pump circuit unit 12B is the internal voltage VPP.

After that, at the time t9, when the clock signal IN4 is "HIGH" and the NMOS transistor M5 is turned on (set to "ON"), there is a current in a direction from the point B of the charge pump circuit unit 11B to the point B' of the charge pump circuit unit 12B. Furthermore, at the time t10 at which the clock signal IN4 is changed to "LOW", the voltage at the points B' and B are "(VPP+VDD)/2".

The above-described operations are repeated.

As described above, in accordance with the boosting charge pump circuit of the third embodiment, the charge pump circuit units 11B and 12B are used. It is possible to set the voltage level of the internal voltage VPP to "2×VDD>VPP>VDD" in the case of DDR1 specifications, and it is possible to boost the voltage level of the internal voltage VPP to approximately "(VPP+3×VDD)/2" in the case of DDR2 specifications.

As described above, the embodiments with regard to the present invention are explained. However, the boosting charge pump circuit of the present invention is not limited by the above-described examples, and it is possible to apply various changes if they are not out of a scope of the present invention.

The boosting charge pump circuit of the present invention has an advantage in which, even though a boosting method of the charge pump circuit is switched between DDR1 and DDR2 specifications, it is possible to avoid providing a charge pump capacitances (capacitor for the charge pump) which is not used. Therefore, it is possible to avoid having an unused area on a semiconductor chip. Moreover, in the present invention, the charge pump circuit is unitized. Therefore, the present invention has an advantage in which the layout is easily designed. The present invention is applicable to, for example, a semiconductor memory apparatus.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A boosting charge pump circuit which boosts an external power supply voltage to a predetermined internal voltage and outputs the internal voltage to an internal power line, the boosting charge pump circuit comprising first and second charge pump circuit units, the first and second charge pump circuit units each comprising:
a first connection switching terminal selecting one of a power source voltage and a boost control voltage which is inputted from outside;
a charge pump capacitor;
a boosting portion which charges the charge pump capacitor to be the power supply voltage, and which boosts the power supply voltage or the boost control voltage selected by the first connection switching terminal by applying a charged voltage of the charge pump capacitor;
a second switching terminal for switching operations of outputting a boosted voltage supplied by the boosting portion to the internal power line and outputting the boosted voltage supplied by the boosting portion as the boost control voltage to the outside; and
a boosted voltage output portion for outputting the boosted voltage to the internal power line if the second connection switching terminal has determined to output the boosted voltage to the internal power line, wherein
the first connection switching terminal selects the power source voltage,
the second connection switching terminal outputs the boosted voltage to the internal power line, and
the boosting charge pump circuit comprises:
a switching portion which connects and disconnects to both a side of outputting a boosted voltage from the charge pump capacitor of the first charge pump circuit unit and a side of outputting a boosted voltage from the charge pump capacitor of the second charge pump circuit unit; and
a control portion which controls both the first and second charge pump circuit units in order to conduct both boosting and discharging operations alternately while having a predetermined interval, and turns on the switching portion during the predetermined interval.

2. A boosting charge pump circuit according to claim 1, wherein each of the charge pump circuit units comprises:
a first buffer gate inputting a first clock signal;
a logically-inverting buffer gate inputting a second clock signal;
a third buffer gate inputting a third clock signal or a ground voltage;
a capacitor which has a terminal to which an output of the first buffer gate is connected;
a charge pump capacitor which has a terminal to which an output of the logically-inverting buffer gate is connected;
a first transistor of a first conductive type FET which has a gate terminal to which another terminal of the charge pump capacitor is connected, which has a drain terminal to which the power source voltage is connected, and which has a source terminal to which another terminal of the capacitor is connected;
a second transistor of the first conductive type FET which has a gate terminal to which another terminal of the first capacitor is connected, which has a drain terminal to which the power source voltage is connected, and which has a source terminal to which another terminal of the charge pump capacitor is connected;
a third transistor of the first conductive type FET which has a gate terminal to which another terminal of the first capacitor is connected, and which has a drain terminal to which the power source voltage is connected;
a fourth transistor of the first conductive type FET which has a gate terminal to which a source terminal of the third transistor is connected;
a first connection switching terminal for selecting a supply power voltage which is one of the power source voltage and a boost control voltage supplied from the outside and is connected to the logically-inverting buffer gate;
a second connection switching terminal for selecting one of the third clock signal and a ground voltage as an input which is connected to the third buffer gate;
a third connection switching terminal for determining whether a voltage of another terminal of the charge pump capacitor is outputted to the outside as the boost control voltage or connected to a drain terminal of the fourth transistor;

a fourth connection switching terminal for selecting whether or not a source terminal of the fourth transistor is connected to the internal power line;

a third capacitor which has a terminal to which a source terminal of the third transistor and a gate terminal of the fourth transistor are connected; and a level converter which inputs both an output voltage of the third buffer gate which is the power source voltage and the internal voltage and outputs a signal obtained by adding both the power source voltage and the internal voltage to another terminal of the third capacitor, wherein the first connection switching terminal selects the power source voltage, the third connection switching terminal is set to output a boosted voltage of the charge pump capacitor to the fourth transistor, and the boosting charge pump circuit comprises:

a fifth transistor which is connected to both a terminal of the second capacitor of the first charge pump circuit unit that is a terminal connected to the third connection switching terminal and a terminal of the second capacitor of the second charge pump circuit unit that is a terminal connected to the third connection switching terminal;

a fourth buffer gate which inputs a fourth clock signal or a ground voltage and a supply source voltage of the fourth buffer gate is the internal voltage;

a fifth connection switching terminal which determines an input of the fourth buffer gate selected from the fourth clock signal and the ground voltage; and a clock signal generation portion which generates the first clock signal, the second clock signal and the third clock signal for controlling operations of the first and second charge pump circuit units in a manner in which both the first and second charge pump circuit units conduct both boosting and discharging operations alternately while having a predetermined interval, and generates the fourth clock signal for turning on the fifth transistor during the predetermined interval.

3. The boosting charge pump circuit according to claim 1, further comprising a clock signal generation portion to generate a plurality of clock signals to control a sequence of boosting operations of said plurality of charge pump circuit units.

4. A semiconductor device comprising the boosting charge pump circuit of claim 1.

* * * * *